Patented Aug. 14, 1945 2,381,939

UNITED STATES PATENT OFFICE 2,381,939

PROCESS OF PRODUCING A DISPERSIVE AGENT

Arthur J. Tiede, Detroit, Mich., assignor to Grover C. Bear, Detroit, Mich.

No Drawing. Application March 10, 1942, Serial No. 434,122

2 Claims. (Cl. 252—356)

This invention relates to dispersive agents and particularly agents inducing gaseous dispersions in liquid or semi-liquid mediums, and further relates to extraction of such agents from vegetable matter and treatment of the extract to increase its dispersive effect, eliminate toxicity, if any and reduce the product to a readily marketable form.

Gaseous dispersions have various well-known uses as for example, the reduction of sugar or starch solutions, gums or gelatines to an aerated and expanded form for imparting lightness and volume to food products. Considerable stability or permanency is often desirable for such expanded products, and to promote these characteristics and further improve the appearance of said products, it is desirable that the dispersed gas cells or globules be of uniformly small cell structure.

An object of the invention is to provide an agent highly conducive to a agseous dispersion in water and in various other lqiuid or semi-liquid mediums, and imparting a much greater degree of stability than has been heretofore attained for such dispersions.

A further object is to provide an agent suited to induce a gaseous dispersion in liquid mediums and to achieve a marked increase in uniformity of dispersed globules, as compared to prior practice.

A further object is to derive the desired agent by extraction from vegetable matter containing saponins and to avoid contamination of the agent by such glucosides.

While the variety of plants from which desired dispersive agent may be extracted is quite large, those considered most available and best suited to the purpose are as follows: *Saponaria officinalis, Agrostemma githago, Sapindus saponaria, Gypsophilia struthium, Quillaja saponaria, Polygala senega, Monimia polystachia, Chrysophyllum glycyphleum* and syringa. These it will be noted are saponin-yielding plants and one of the features of present invention is elimination of saponin from desired product. Saponin has been used to some extent to produce foam or froth in beverage manufacture, but it is undesirable for my purpose due to its toxicity and because I have discovered a more effective agent.

One or more of the plants identified or selected portions thereof, are chopped, crushed, powdered, or otherwise prepared for extraction. An initial extraction from the materials thus prepared is accomplished by treating them with ethyl or methyl alcohol or both, preferably by boiling the alcohol under suitable pressure. The purpose of this initial extraction is to withdraw from the plant materials such saponin as is present. After filtering off or otherwise removing the alcoholic extract, the plant materials are washed and then subjected to a further and exhaustive extraction, using moderately alkaline water as the extractive medium, said materials being preferably previously soaked in such water for a period of fifteen hours or more. To impart desired alkalinity, the water may be treated with any of various alkalis, as for example, sodium borate, sodium hydroxide, or ammonium hydroxide. The purpose of alkalinity is to destroy enzymes extracted from the plant material, and to replace such enzymes with others of nontoxic nature there is further added to the water a suitable quantity of cereal gluten. Also it is preferred to add a sufficient quality of pure tea at this time to counteract toxicity. After heating the plant materials and treated water almost to the boiling point, the extract is filtered off and concentrated by evaporation, preferably under vacuum, being thus reduced to a heavy syrup. This syrup is now treated, while boiling, with an aqueous solution of a suitable catalyst, as zinc chloride or is purified with lead acetate. The liquid is now filtered and the filtrate is allowed to cool and is treated with either acetone or ether, in equal amount. There results a finely divided precipitate from which the liquid may be filtered or drawn off. To further purify this precipitate it is rewashed with acetone, ether, or alcohol and it may be further treated with chloroform to remove coloring matter, if present. Finally, the precipitate is dried, preferably under vacuum and in presence of carbon dioxide, its final form being that of a very light, chalky and readily soluble powder.

Following is a more concise statement of the process, with definite weights given for materials employed.

To 120 cc. of ethyl or methyl alcohol or a mixture thereof add 2 cc. of ammonium water, U. S. P. from 27% to 29%, and 22 grams of suitably prepared Quillaja bark. Allow to soak for twelve hours or more and then heat almost to boiling point. Separate the resulting extract from the bark by filtration or in other suitable manner. Place the residual bark in 300 cc. of cold water wherein ½ gram of sodium borate has been dissolved, together with 3 grams of processed gluten and 1½ grams of pure tea. After heating the liquid almost to the boiling point, add 0.2 gram of zinc chloride or lead acetate. Again heat almost to boiling point, then strain or filter. Add to residue 60 cc. of water, heat as before, strain and filter, and add resulting filtrate to that obtained earlier in the process. Evaporate until a thick syrup remains and allow to cool. Treat this syrup with an equal volume of acetone to dissolve its soluble ingredients including the metal salt or salts. Filter off or otherwise withdraw the liquid. Rewash the residue with additional acetone or alcohol, and such residue when dried will be a light chalky powder. If necessary to remove coloring matter, treatment of residue with chloroform will serve that purpose.

Product thus attained is highly effective as a dispersive agent, particularly for inducing gaseous dispersions. Thus, for example, if a gram of this powder is added to 120 cc. of water or other suitable liquid and such liquid is thoroughly agitated, as by a power beating mechanism, the liquid becomes highly aerated and expanded, due to dispersion therein of small uniform globules of air characterized by a much greater stability than has been heretofore attained. In the case of a complete dispersion, or one comprised entirely of globules, this stability is such that the mass may be cut into slices like a solid, without material resulting transition to liquid form. As further indicating the very considerable dispersive effect of the agent produced as above described, it may be mentioned that it will so aerate a given volume of water as to multiply that volume approximately twenty-four times.

There are many uses for the dispersive agent produced as described. Since inclusion of any toxic ingredient has been avoided, it is feasible to use the agent in many foods and beverages where lasting aerating effect is desired. Such an effect is further sometimes desirable in other products as soaps, dyes, plant foods and plastics.

As a by-product of the process described, saponin may be recovered from the extract formed by the initial or alcoholic treatment of the plant materials. Thus the alcoholic extract may be evaporated, by heating or evacuation or both, until it is reduced to a thick syrup. If it is desired to destroy or counteract toxicity in the saponin, the syrup may now be treated with a concentrated tea extract or with any of the following: cholesterol, acetic anhydrate, untreated lecithin, or ergosterol. Finally, the syrup is treated with acetone or ether to dissolve all ingredients other than the saponin. After separating the latter from the liquid, it is washed with additional acetone or ether and upon drying it assumes the form of a very fine and light chalky powder.

What I claim is:

1. A process of producing a dispersive agent, which comprises comminuting to a finely divided form saponin-containing vegetable matter preparatory to extraction, subjecting said matter for extraction purposes to methyl alcohol as a solvent, separating the extract from the vegetable residue, treating such residue with alkaline water to effect a further extraction and destroy enzymes, adding a suitable quantity of cereal gluten to replace such enzymes, heating the treated residue to an approximate boiling temperature, separating the resultant extract from the residue, concentrating the extract to syrup consistency, boiling the concentrate and treating it while boiling with zinc chloride in aqueous solution as a catalyst, filtering the product and treating the filtrate, when cooled, with acetone to obtain a precipitate, separating the precipitate from the filtrate, washing it with acetone, and drying such precipitate.

2. A process of producing a dispersive agent, which comprises comminuting to a finely divided form saponin-containing vegetable matter preparatory to extraction, subjecting said matter for extraction purposes to methyl alcohol as a solvent, separating the extract from the vegetable residue, treating such residue with alkaline water to effect a further extraction and destroy enzyme, adding a suitable quantity of cereal gluten to replace such enzymes and also adding substantially pure tea to counteract toxicity, heating the treated residue to an approximate boiling temperature, separating the resultant extract from the residue, concentrating the extract to syrup consistency, boiling the concentrate and treating it while boiling with zinc chloride in aqueous solution as a catalyst, filtering the product and treating the filtrate, when cooled, with acetone to obtain a precipitate, separating the precipitate from the filtrate, washing it with acetone, and drying such precipitate.

ARTHUR J. TIEDE.